US008839247B2

(12) United States Patent
Millmore et al.

(10) Patent No.: US 8,839,247 B2
(45) Date of Patent: Sep. 16, 2014

(54) MANAGING REQUESTS TO INITIATE TASKS WITHIN AN ORGANIZATION

(75) Inventors: Martin Millmore, Reading (GB); Dinesh Arora, Cupertino, CA (US); Michael Rossi, Manhattan Beach, CA (US); Aaron Green, San Francisco, CA (US); Paul Brimble, Yelverton (GB)

(73) Assignee: Oracle International Corporation, Redwood Shores, CA (US)

( * ) Notice: Subject to any disclaimer, the term of this patent is extended or adjusted under 35 U.S.C. 154(b) by 1602 days.

(21) Appl. No.: 12/171,463

(22) Filed: Jul. 11, 2008

(65) Prior Publication Data
US 2010/0011361 A1 Jan. 14, 2010

(51) Int. Cl.
*G06F 9/46* (2006.01)
*G06F 21/62* (2013.01)

(52) U.S. Cl.
CPC .... *G06F 21/6218* (2013.01); *G06F 2221/2141* (2013.01)
USPC ......................................................... 718/100

(58) Field of Classification Search
None
See application file for complete search history.

(56) References Cited

U.S. PATENT DOCUMENTS

| 5,940,590 | A  | * | 8/1999 | Lynne et al. | 726/35 |
|---|---|---|---|---|---|
| 6,747,677 | B2 |   | 6/2004 | Millmore |  |
| 2002/0069081 | A1 | * | 6/2002 | Ingram et al. | 705/1 |
| 2004/0083287 | A1 | * | 4/2004 | Gao et al. | 709/226 |
| 2005/0043940 | A1 | * | 2/2005 | Elder | 704/9 |

OTHER PUBLICATIONS

Oracle, "Secure Enterprise Search, Version 10.1.8.2", Oracle Technical White Paper, Oct. 2007.

\* cited by examiner

*Primary Examiner* — Gregory A Kessler
(74) *Attorney, Agent, or Firm* — Miles & Stockbridge P.C.

(57) ABSTRACT

Systems and methods are disclosed herein for managing task requests. An end-user device include one or several possible implementation for managing task requests. Specifically, the end-user device comprises a processing device and a memory device, which is configured to store a task request managing program. The processing device is configured to execute the task request managing program. The processing device is configured to analyze a string of characters of a natural language request from a user to extract a requested task and a requested object. The processing device is further configured to check whether the user is permitted to initiate the requested task on the requested object. In addition, the processing device is configured to perform the requested task on the requested object when it is determined that the user is permitted to initiate the requested task on the requested object.

20 Claims, 2 Drawing Sheets

MANAGING REQUESTS TO INITIATE TASKS WITHIN AN ORGANIZATION

TECHNICAL FIELD

The embodiments of the present disclosure generally relate to performing certain tasks within an organization and more particularly relate to managing requests to initiate the tasks.

BACKGROUND

Enterprise resource planning ("ERP") systems integrate multiple networks and databases of an organization into a single system using hardware and software components. ERP systems can thereby synchronize information and data from various sources. In order for users in the organization to access or modify information on the networks, the user must be given permission to perform certain tasks.

Security systems are typically built into ERP system to restrict access only to authorized users. One type of security system is defined by the standard referred to as a role-based access control ("RBAC") system. In an RBAC system, each user within an organization can be assigned one or more roles, which are related to specific job functions. Permissions to perform various actions are assigned to one or more roles. Thus, if a user is assigned with a particular role that gives the user permission to perform certain actions, then that user can request these actions when needed.

For example, a user having a human resources ("HR") role may be given the responsibility of promoting employees. In order to perform this task, the HR user can perform a search of a database within the networks of the organization for a specific employee. Then, a task (e.g., a promotion) can be selected from a group of tasks to be performed on the selected employee. Alternatively, the HR user can select a task first and then select the person to which the task is applied. Other than HR roles, users may have responsibilities in the areas of finance, procurement, etc.

SUMMARY

The embodiments of the present disclosure describe systems, methods, and associated software for managing task requests within an organization. In one particular embodiment, among others, an end-user device comprises a processing device and a memory device that is configured to store a task request managing program. The processing device is configured to execute the task request managing program to analyze a string of characters of a natural language request from a user to extract a requested task and a requested object. The processing device is further configured to check whether the user is permitted to initiate the requested task on the requested object. Also, the processing device is configured to perform the requested task on the requested object when it is determined that the user is permitted to initiate the requested task on the requested object.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

The embodiments of the present disclosure describe systems, methods, and software configured to manage requests to perform certain tasks within an organization. In the present disclosure, the term "task" can refer to any action, function, process, work, manufacturing related task, financial transaction, procurement transaction, human resources action, database modification, etc., within an organization. The tasks as mentioned herein are applied to a specific object. In the present disclosure, an "object" can refer to a person, employee, or member of the organization, equipment, supplies, invoices, records, financial data, payroll records, position or title information, insurance information, purchase requisitions, expense reports, contracts, etc.

In order for a user to initiate a task on an object, the user makes a request to initiate such a task. An access control security systems, such as a role-based access control ("RBAC") system, can help to narrow down a user's authorized tasks based on the rights of the user. For example, the access control security system may include a table for each employee that lists the tasks authorized by the employee and lists the corresponding objects upon which the respective tasks can be applied. Using such information, the access control security system can filter a task request from a user through the authorization table to narrow down the requested task and object to those that are authorized by the user. This filtering can also help to determine the meaning of a certain task request.

According to the embodiments of the present disclosure, the request to initiate such tasks is entered as a natural language request. For example, an HR user can initiate a process to promote an employee by simply entering a request such as "Promote John Smith", "John Smith promotion", or some other similar entry. By allowing entry of natural language requests, the embodiments disclosed herein are able to extract a task and an object that is subject to the task. Therefore, entry of requests to perform certain tasks can be simplified into a simple step, which can save time for the users within the organization compared to prior art systems that require at least two steps of searching through menus of options.

Figure 1:
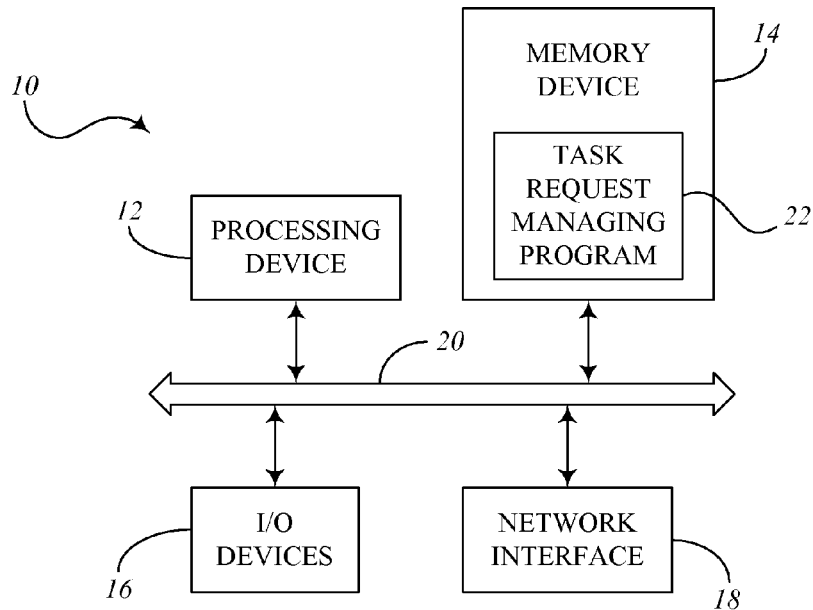
FIG. 1 is a block diagram of an end-user device according to one embodiment.

FIG. 1 is a block diagram illustrating an embodiment of an end user device 10. End user device 10 may comprise a computer or other suitable communication device allowing a user to transmit and receive data, information, and instructions with other devices connected to networks of an organization. In particular, end user device 10 may be implemented as a device allowing a user to request a certain task on a certain object. In this embodiment, end user device 10 comprises a processing device 12, a memory device 14, input/output ("I/O") devices 16, and network interface 18. The components of end user device 10 are interconnected with each other by way of a bus 20. Processing device 12 may be a general-purpose or specific-purpose processor or microcontroller. Memory device 14 may include any suitable type of storage components and, according to this and other embodiments, includes a task request managing program 22 stored therein.

Memory device 14 may include one or more internally fixed storage units, removable storage units, and/or remotely accessible storage units. The storage units can be configured to store information, data, instructions, and/or software code. The storage units may include any combination of volatile memory, such as random access memory ("RAM"), dynamic RAM ("DRAM"), etc., and/or non-volatile memory, such as read only memory ("ROM"), electrically erasable programmable ROM ("EEPROM"), flash memory, etc.

Task request managing program 22 stored in memory device 14 can be executed by processing device 12. Various logical instructions or commands may be included in task request managing program 22 for managing task requests within an organization. The embodiments of task request managing program 22 described in the present disclosure can be implemented in hardware, software, firmware, or a combination thereof. When implemented in software or firmware, task request managing program 22 is stored in memory device 14 and executed by processing device 12. Alternatively, when implemented in hardware, task request managing program can be implemented in processing device 12 using discrete logic circuitry, an application specific integrated circuit ("ASIC"), a programmable gate array ("PGA"), a field programmable gate array ("FPGA"), other suitable logic circuit, or any combination thereof.

Task request managing program 22 or other software or logic code including executable logical instructions as described herein, can be embodied in computer-readable media for execution by any suitable processing device, such as processing device 12. The computer-readable media as described herein can include one or more suitable physical media components that can store the software, programs, or computer code for a measurable length of time.

I/O devices 16 may include input mechanisms such as keyboards, keypads, cursor control devices, or other data entry devices. The input mechanisms may be used for entering information in memory device 14. For example, to request a task, a user can type the request or enter the request using other suitable mechanisms. I/O devices 16 also include output devices such as computer monitors, audio output devices, printers, or other peripheral devices.

Figure 2:
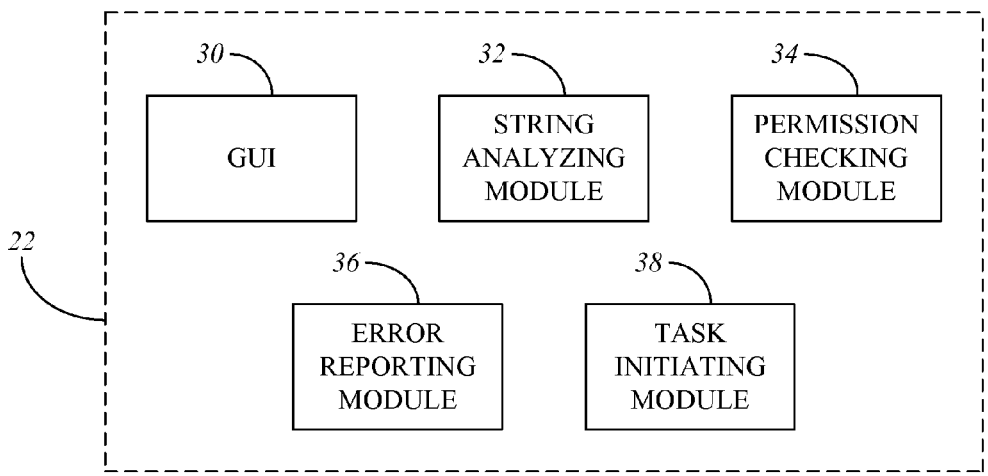
FIG. 2 is a block diagram of the task request managing program shown in FIG. 1 according to one embodiment.

FIG. 2 is a block diagram of an embodiment of task request managing program 22 shown in FIG. 1. According to this embodiment, task request managing program 22 comprises a graphical user interface ("GUI") 30, a string analyzing module 32, a permission checking module 34, an error reporting module 36, and a task initiating module 38. GUI 30 can provide a text box or other suitable input structure that can be used to receive input from the user. A request such as "Promote John Smith," "Pay invoice 1234," etc., can be entered using GUI 30. GUI 30 can also provide feedback if additional information might be needed, such as when a request includes ambiguities that need to be resolved. For example, if the user is authorized to promote more than one person named John Smith, then GUI 30 can display for the user's selection a list of the John Smiths under the user's authorization with respect to the particular task. GUI 30 can also provide feedback to the user to indicate when the requested task has been successfully performed or if there were an error.

String analyzing module 32 receives the string of characters that the user enters as the request. String analyzing module 32 is able to recognize requested tasks entered at the beginning or end of the string and is able to recognize variations in the language that refer to a single task. For example, string analyzing module 32 is able to recognize requests such as "Promote John Smith," "Promoting John Smith," or "John Smith promotion" as a request to "promote." Also, string analyzing module 32 is able to recognize within the request an object to which the task is to be applied. In the above examples, the object receiving the task would be recognized as "John Smith." Therefore, string analyzing module 32 is able to extract the requested task and requested object from the natural language request.

In some embodiments, the request can be filtered through permission checking module 34 to check whether the user is authorized to initiate the requested task on the particular object. According to some implementations, permission checking module 34 may receive information from or be associated with a corporation's access control security system. If a recognizable task and object cannot be extracted by string analyzing module 32, error reporting module 36 is configured to provide an error indication to the user explaining that a task and/or object were not recognized in the request. In addition, if the extracted task and object are not confined within the requestor's sphere of authorization based on information within the organization's access control security system, then error reporting module 36 may indicate an error in this case as well. When an error is reported, the user can correct any errors or use different language to make another request via GUI 30.

Based on information regarding permissions and privileges within an access control security system, e.g., an RBAC system, permission checking module 34 compares the required permissions for initiating the task with the permissions defined within the user's roles to make sure the requester is properly authorized. Error reporting module 36 is configured to report an error when permission checking module 34 determines that the user is not permitted to initiate the task on the object.

In other embodiments, permission checking module 34 can perform different types of checking algorithms depending on the level of sophistication. For example, permission checking module 34 may first check to make sure the requestor is permitted to initiate the requested task on any object. Secondly, permission checking module 34 may check whether the requestor is permitted to initiate any task on the requested object. And lastly, permission checking module 34 may use the combination of the requested task and requested object to determine whether the requestor is permitted to initiate the requested task on the requested object. If any of these permission have not been granted to the requester, then error reporting module 36 can report the error to the requestor explaining the particular access issue.

If permission checking module 34 determines that the requestor is permitted in each respect to initiate the requested task on the requested object, then task initiating module 38 instructs the proper components or software to carry through to completion the performance of the requested task on the requested object. In some embodiments, task initiating module 38 may include logic to perform the actual task itself. In other embodiments, task initiating module 38 instructs other components within the networks of the organization to complete the requested task.

Figure 3:
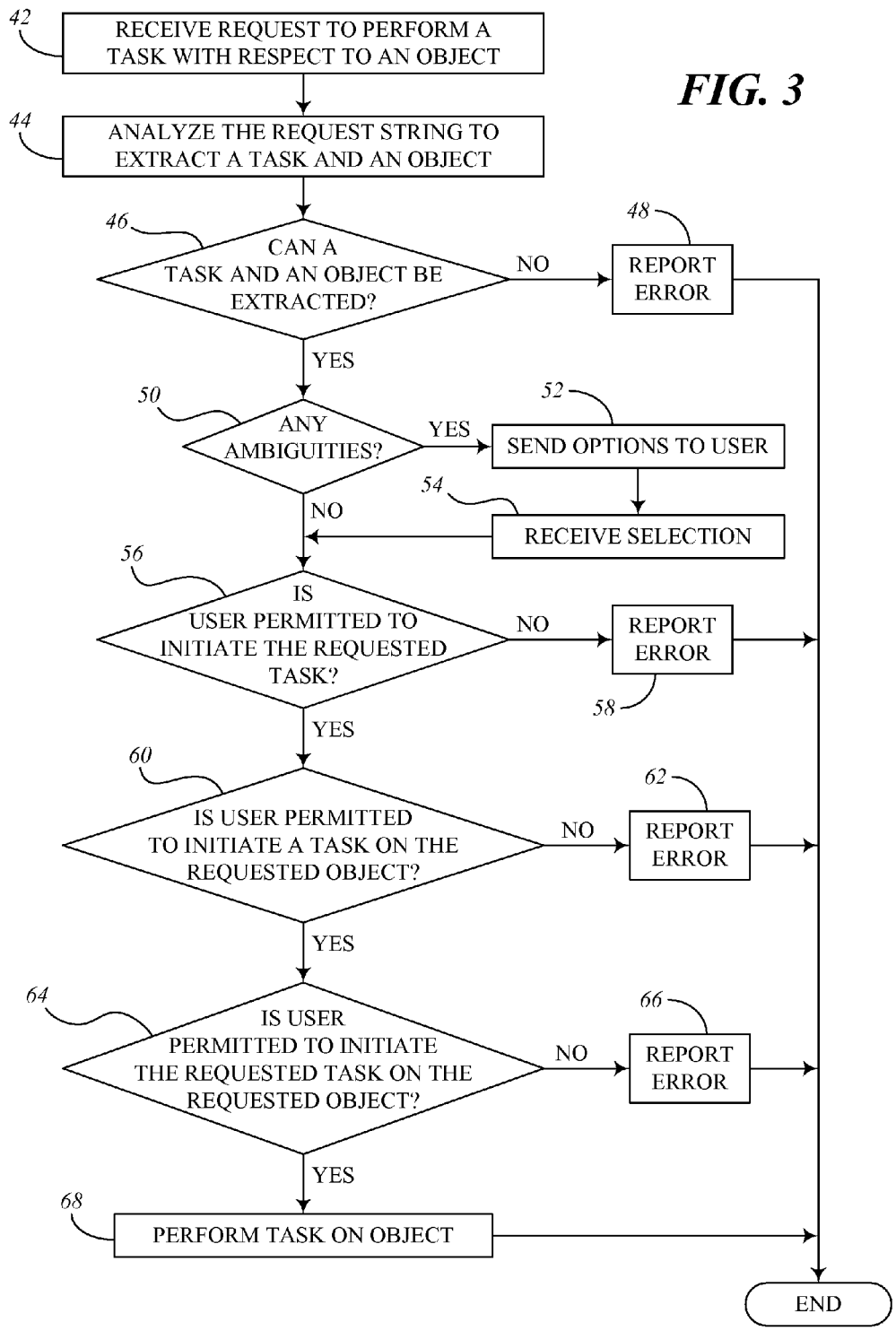
FIG. 3 is a flow diagram illustrating a method of managing task requests according to one embodiment.

FIG. 3 is a flow diagram illustrating an embodiment of a method for managing task requests. As indicated in block 42, a request to perform a particular task with respect to a particular object is received. As indicated in block 44, the request string is analyzed to extract a task and an object from the request. In some embodiments, extracting the task and object may further include filtering the request through a permission analyzing module, such as a RBAC system, to narrow down the request to only the tasks and corresponding group of objects that are within the user's authorization. Regarding the embodiments where the rights of the requestor are analyzed while extracting the information from the request, blocks 56, 60, and 64, as described below, can be omitted according to some implementations.

As indicated in decision block 46, it is determined whether or not a task and an object can be extracted from the request string. If both a task and object cannot be extracted, the flow diagram proceeds to block 48, which indicates that an error is reported to the user. The error might explain that a task and object were not properly received. If both the task and the object can be extracted, the flow diagram proceeds to decision block 50.

The task and object are compared with a database to determine whether or not any ambiguities exist, as indicated in block 50. In some embodiments, the presence of ambiguities can be determined from information stored in an access control security system, e.g. RBAC, concerning the requestor's list of privileges. In other embodiments, the presence of ambiguities can be determined from a database associated with all or some of the corporation. For example, if there are multiple people in the organization that can be identified as the object, then an ambiguity exists. When it is determined that an ambiguity exists, the flow diagram proceeds to block 52, which indicates that options are sent to the user for selecting the one object on which the user intends to perform the task. As indicated in block 54, the user's selection is received to resolve the ambiguity, and the flow diagram proceeds to block 56. If no ambiguities exist are determined in decision block 50, then blocks 52 and 54 are bypassed and the flow diagram proceeds to block 56.

According to decision block 56, the requested task is checked with the privileges of the user to determine whether or not the user is permitted to initiate the requested task, if this check has not already been made. If it is determined that the user is not permitted to perform the task, then the flow diagram proceeds to block 58, which indicates that an error is reported to the user to explain that the user is not authorized to perform the requested task. If it is determined in block 56 that the user is permitted to perform the task, the flow diagram proceeds to decision block 60. However, in other embodiments, the flow diagram may skip block 60 and proceed to block 64. As indicated in block 60, it is determined whether or not the user is permitted to perform any task on the requested object. If not, the flow diagram proceeds to block 62, which indicates that an error is reported to explain that the user is not permitted to perform a task on the requested object. If the user has been given permission in this regard, the flow diagram proceeds to decision block 64.

As indicated in decision block 64, it is determined whether the user is permitted to perform the requested task on the requested object. If not, the flow diagram proceeds to block 66, which indicates that an error is reported to the user to explain that the user is not permitted to perform the requested task on the requested object. After reporting the error, as indicated in each of blocks 48, 58, 62, and 66, the flow diagram comes to an end. If it is determined in block 64 that the user is permitted to perform the requested task on the requested object, then the flow diagram proceeds to block 68. According to block 68, the task is performed on the object. In other embodiments, block 68 may alternatively include instructing another device within the organization to perform the task on the object.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art. For example, decision blocks 56, 60, and 64 may be combined into one decision block to determine the privileges of the user.

The embodiments described herein represent a number of implementations or examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A method of managing a task request, the method comprising:
   receiving, from a requestor, a request to initiate a task on an object within an organization, wherein the request comprises a natural language statement;
   extracting the requested task and requested object from the request by recognizing the task and the object to which the task is to be applied within the natural language statement, wherein the task comprises an action that can be authorized based on a role of the requestor;
   analyzing the extracted requested task and extracted requested object to determine whether the requestor is permitted to initiate the requested task on the requested object, wherein the analyzing comprises determining the role of the requestor and one or more privileges for the role, and determining if the task is included in the one or more privileges;
   reporting an error when the requestor is not permitted to initiate the requested task on the requested object; and
   performing the requested task on the requested object when the requestor is permitted to initiate the requested task on the requested object.

2. The method of claim 1, further comprising:
   reporting a second error if the requested task and the requested object cannot be extracted from the request.

3. The method of claim 1, further comprising:
   determining whether an ambiguity exists with respect to the requested object.

4. The method of claim 3, further comprising:
   sending a group of selections to the requestor when the ambiguity exists; and
   receiving a selection from the requestor to resolve the ambiguity.

5. The method of claim 1, wherein analyzing the requested task and requested object further comprises:
   determining whether the requestor is permitted to initiate the requested task; and
   determining whether the requestor is permitted to initiate the requested task on the requested object.

6. The method of claim 5, further comprising:
   reporting a second error if the requestor is not permitted to initiate any task on the requested object.

7. The method of claim 1, wherein the task is selected from at least one of a manufacturing related action, a financial transaction, a human resources action, or a modification of a database of the organization.

8. The method of claim 1, wherein the object is an employee of the organization.

9. The method of claim 1, wherein the object is selected from at least one of: equipment within the organization, an invoice, a personnel record, a purchase requisition, or an expense report.

10. The method of claim 1, wherein permission is granted to the requestor based on role-based privileges for allowing access to one or more networks of the organization.

11. The method of claim 1, wherein extracting the requested task and requested object from the request further comprises analyzing a string of characters of the natural language request to extract the requested task and the requested object.

12. The method of claim 1, wherein the task request is received by an enterprise resource planning ("ERP") system.

13. A computer program residing on a non-transitory computer-readable medium, the computer program comprising:
   logic adapted to analyze a string of characters of a request to extract a requested task and a requested object, wherein the request comprises a natural language statement and wherein the extract logic comprises recognizing the task and the object to which the task is to be applied within the natural language statement, wherein the task comprises an action that can be authorized based on a role of the requestor;
   logic adapted to check whether a user is permitted to initiate the requested task on the requested object by filtering the requested task and the requested object through an authorization table for the user, the authorization table comprising tasks authorized for the user and corresponding objects upon which the tasks can be applied and by determining the role of the requestor and one or more privileges for the role, and determining if the task is included in the one or more privileges;
   logic adapted to report an error when it is determined that the user is not permitted to initiate the requested task on the requested object; and
   logic adapted to initiate the requested task on the requested object when it is determined that the user is permitted to initiate the requested task on the requested object.

14. The computer program of claim 13, further comprising a graphical user interface enabling the user to enter the request using natural language.

15. The computer program of claim 13, wherein the logic adapted to check whether a user is permitted to initiate the requested task is further adapted to compare the requested task and requested object with information of the user's authorization stored in an access control security system.

16. The computer program of claim 13, wherein the computer program is a task request managing program stored in memory of an end-user device.

17. An end-user device comprising:
   a processing device;
   a memory device configured to store a task request managing program;
   wherein the processing device is configured to execute the task request managing program to:
      analyze a string of characters of a request from a user to extract a requested task and a requested object, wherein the request comprises a natural language statement and wherein the extract logic comprises recognizing the task and the object to which the task is to be applied within the natural language statement, wherein the task comprises an action that can be authorized based on a role of the requestor;
      filter the requested task and the requested object through an authorization table for the user, the authorization table comprising tasks authorized for the user and corresponding objects upon which the tasks can be applied and determining the role of the requestor and one or more privileges for the role, and determining if the task is included in the one or more privileges;
      check whether the user is permitted to initiate the requested task on the requested object; and
      perform the requested task on the requested object when it is determined that the user is permitted to initiate the requested task on the requested object.

18. The end-user device of claim 17, further comprising a network interface in communication with a network of an organization.

19. The end-user device of claim 17, wherein analyzing the string of characters includes analyzing a request entered using natural language.

20. The end-user device of claim 17, wherein the end user device is a computer.

* * * * *

UNITED STATES PATENT AND TRADEMARK OFFICE
CERTIFICATE OF CORRECTION

| | | |
|---|---|---|
| PATENT NO. | : 8,839,247 B2 | Page 1 of 1 |
| APPLICATION NO. | : 12/171463 | |
| DATED | : September 16, 2014 | |
| INVENTOR(S) | : Millmore et al. | |

It is certified that error appears in the above-identified patent and that said Letters Patent is hereby corrected as shown below:

In the Specification

In column 4, line 28, delete "requester" and insert -- requestor --, therefor.

In column 4, line 44, delete "requester," and insert -- requestor, --, therefor.

Signed and Sealed this
Seventeenth Day of March, 2015

Michelle K. Lee
*Director of the United States Patent and Trademark Office*